US008443413B2

United States Patent
Hiers (10) Patent No.: US 8,443,413 B2
(45) Date of Patent: May 14, 2013

(54) LOW-LATENCY MULTICHANNEL VIDEO PORT AGGREGATOR

(75) Inventor: Todd C. Hiers, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 575 days.

(21) Appl. No.: 12/334,807

(22) Filed: Dec. 15, 2008

(65) Prior Publication Data

US 2009/0158379 A1 Jun. 18, 2009

Related U.S. Application Data

(60) Provisional application No. 61/013,754, filed on Dec. 14, 2007.

(51) Int. Cl.
*H04N 7/173* (2006.01)

(52) U.S. Cl.
USPC .......................................... 725/119; 725/120

(58) Field of Classification Search ........................ None
See application file for complete search history.

(56) References Cited

U.S. PATENT DOCUMENTS

| | | | | |
|---|---|---|---|---|
| 5,428,396 | A * | 6/1995 | Yagasaki et al. | 375/240.16 |
| 6,097,441 | A * | 8/2000 | Allport | 348/552 |
| 6,272,278 | B1 * | 8/2001 | Takahata et al. | 386/216 |
| 6,981,045 | B1 * | 12/2005 | Brooks | 709/226 |
| 7,079,176 | B1 * | 7/2006 | Freeman et al. | 348/207.1 |
| 2002/0122493 | A1 * | 9/2002 | Lin | 375/240.27 |
| 2002/0174430 | A1 * | 11/2002 | Ellis et al. | 725/46 |
| 2003/0048853 | A1 * | 3/2003 | Oh et al. | 375/240.28 |
| 2003/0123702 | A1 * | 7/2003 | Colmenarez et al. | 382/103 |
| 2004/0194134 | A1 * | 9/2004 | Gunatilake et al. | 725/38 |
| 2004/0237110 | A1 * | 11/2004 | Jones, Jr. | 725/74 |
| 2006/0256865 | A1 * | 11/2006 | Westerman | 375/240.12 |

\* cited by examiner

*Primary Examiner* — Cai Chen

(74) *Attorney, Agent, or Firm* — Robert D. Marshall, Jr.; Wade James Brady, III; Frederick J. Telecky, Jr.

(57) ABSTRACT

A video port aggregator receives plural asynchronous video data streams. Corresponding input buffers generate video data and a status signal. A memory controller writes the video data in corresponding locations within an external memory. A channel triggers the memory controller to read data out of the external memory for transmission to a single video output port when said corresponding status signal indicates receipt of a predetermined portion of data. This read out of the external memory being faster than the writing. The channel sequencer triggers the memory controller to read data out of the external memory video data of a highest priority asynchronous video data stream having a received next portion of data.

8 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

LOW-LATENCY MULTICHANNEL VIDEO PORT AGGREGATOR

CLAIM OF PRIORITY

This application claims priority under 35 U.S.C. 119(e)(1) to U.S. Provisional Application No. 61/013,754 filed Dec. 14, 2007.

TECHNICAL FIELD OF THE INVENTION

The technical field of this invention is video port aggregators.

BACKGROUND OF THE INVENTION

Powerful Video DSPs are often used in High-Definition video systems. A single DSP is generally responsible for processing a high resolution, high quality video image. Such processors have the capability to process multiple video streams of a lower resolution or quality, but lack sufficient input/output resources to input such multiple data streams. There is a need in the art for a solution which overcomes the I/O limitation to allow multiple channels of video data to be received by a processor via just one digital video port.

SUMMARY OF THE INVENTION

This invention uses external logic field programmable gate array (FPGA) to implement a buffer that receives data from multiple inputs and transmits to a single output. This buffer can control how much data is buffered before being sent to the DSP and can encapsulate or mark the data so the receiving DSP can determine the source of the data.

This invention has the following advantages. Prioritization allows fully asynchronous data flows without the need to drop or repeat video frames. Prioritization allows for minimum latency on specified video channels. Encapsulation allows small buffer sizes, decreasing both the cost of implementation and reducing latency of data through the buffer.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
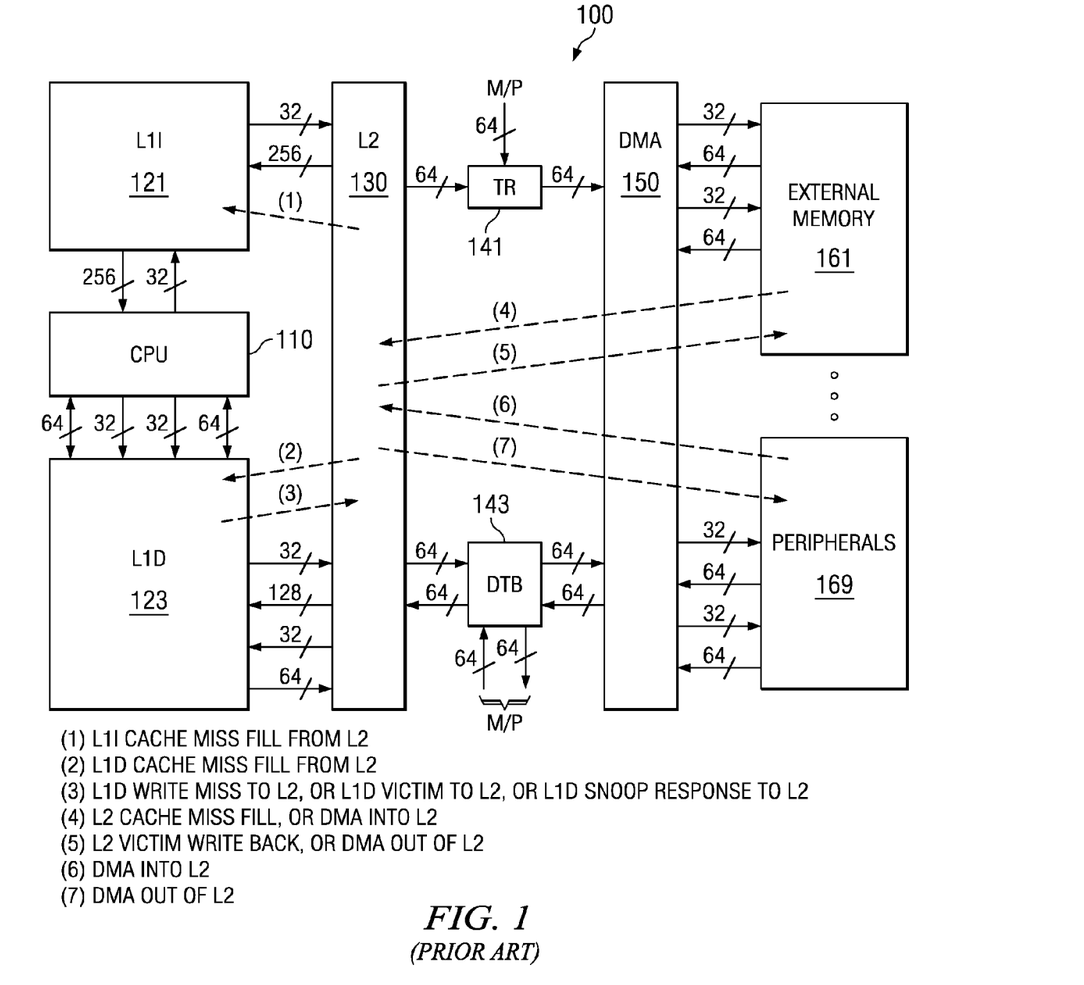
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
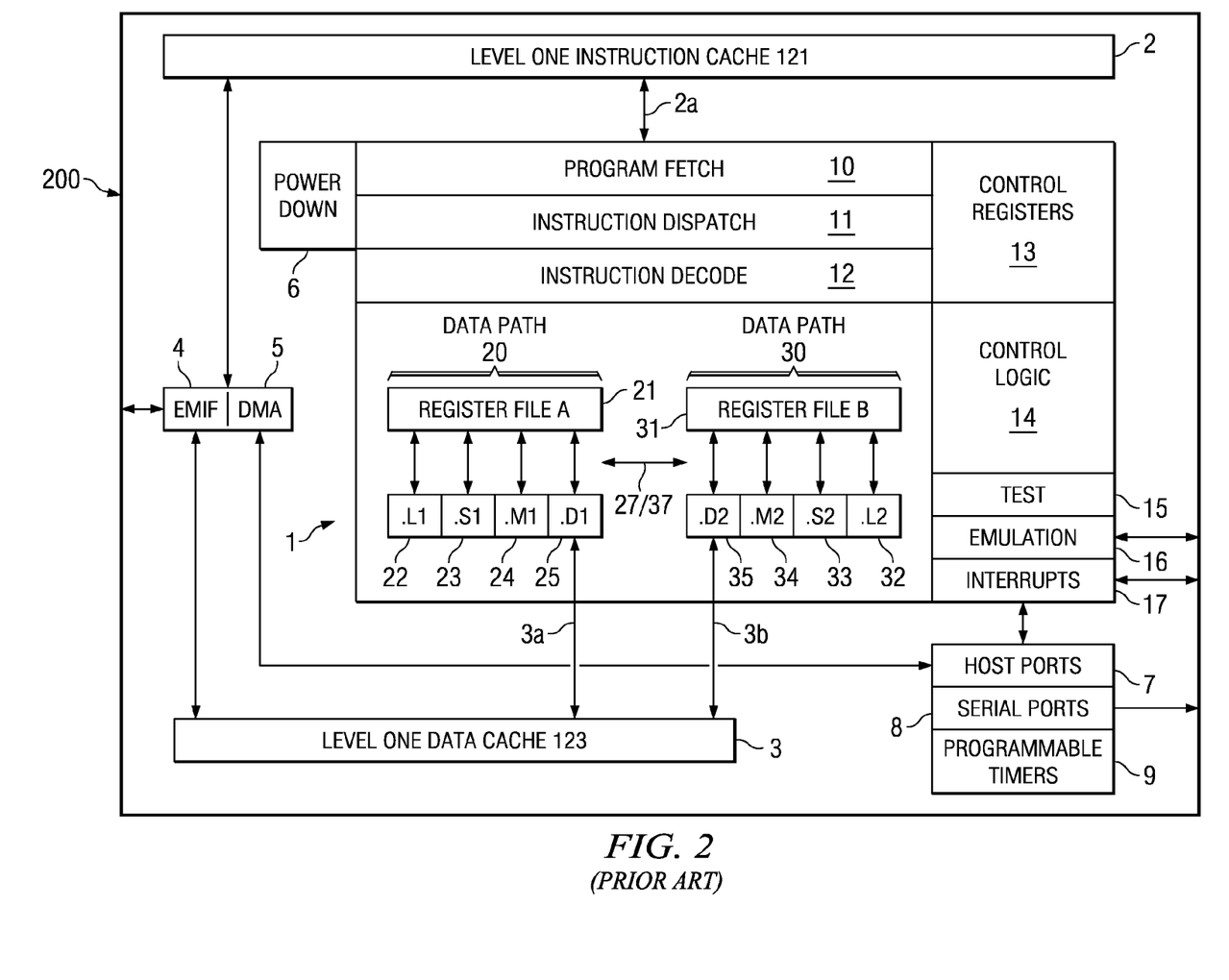
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
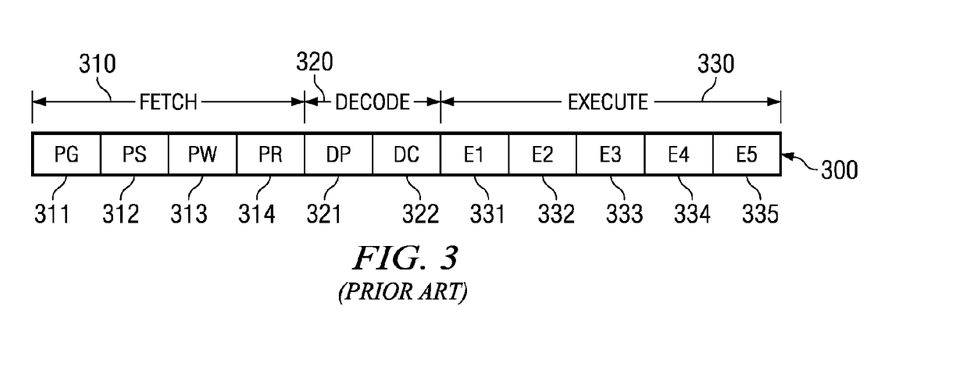
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
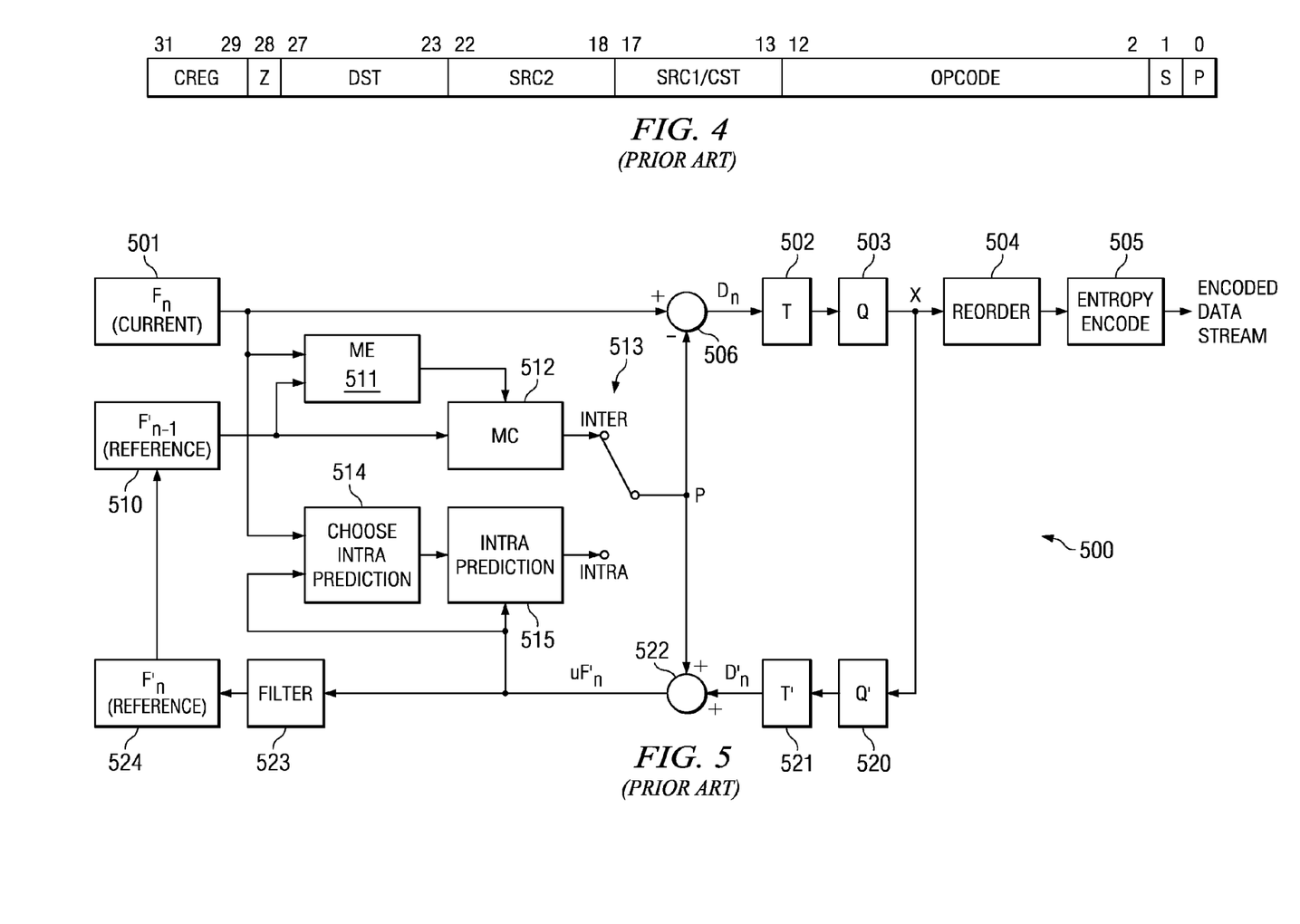
FIG. 4 illustrates the instruction syntax of the very long instruction word digital signal processor core illustrated in FIG. 2 (prior art)
FIG. 5 illustrates an overview of the video encoding process of the prior art.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |

TABLE 1-continued

| Conditional | creg | | | z |
|---|---|---|---|---|
| Register | 31 | 30 | 29 | 28 |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th (current) frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content adaptive binary arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For inter prediction, data from n−1 th (previous) frame $F_{n-1}$ 510 and data from the n th frame $F_n$ 501 supply motion estimation block 511. Motion estimation block 511 determines the positions and motion vectors of moving objects within the picture. This motion data is supplied to motion compensation block 512 along with data from n−1 th frame $F_{n-1}$ 510. The resulting motion compensated frame data is selected by switch 513 for application to subtraction unit 506. Subtraction unit 506 subtracts the inter prediction data from switch 513 from the input frame data from n th frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the n th frame $F_n$ and the n−1 th frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from n th frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the n th frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

A typical application of this invention is storing the data from plural security cameras. Security cameras are often of low resolution compared of high definition television (HDTV) in terms of pixels per frame and generally are monochrome rather than color. Thus the data rate from a single security camera is much less than the data rate of a single HDTV stream.

Several factors make storage of the output of several security camera output in compressed data form in non-volatile memory, such as a computer hard drive, advantageous. Almost all security camera information is unneeded. Most often security cameras show nothing or nothing of interest. Most security camera data is never viewed after capture. Often video tapes of the security camera pictures are over-written without being viewed. Proper storage and reuse of video tapes requires constant attention. When the security camera data is reviewed, often the reviewer is interested on only a particular and limited time window. Finding the correct time window in a video tape even with an on-screen date and time stamp is generally a tedious process. Reuse of video tape by overwriting may make even finding the proper tape tedious. A video date and time stamp will not help much because the video tape must be put into a player and viewed to see the date and time stamp. Compressed video on a computer hard drive makes the process of review much easier. Firstly, video compression reduces the amount of data that must be stored. Thus the amount of data stored for a static camera viewing an unchanging scene is minimized. Automated systems controlled by the computer can control the recycling of storage space making sure that only the oldest security camera views are overwritten. Meta data stored with the security camera data can substantially automate the process of finding a particular time window to review.

In addition it would be advantageous in such a compressed video storage system to use a digital signal processor such as described above in conjunction with FIGS. 1 to 4. Such a digital processing system would include the computational capacity to perform real time video data compression upon several relatively low data rate security camera views. One problem with more extensive use of such digital signal processors for these type applications is the video input port. Integrated circuits including such high computational capacity digital signal processors often include only one video input port suitable for high definition television.

This invention aggregates multiple asynchronous video sources to feed into a single video capture port on digital media device. This invention preferable aggregates up to 8 D1 streams or 16 CIF streams while adding minimal latency added.

Figure 6:
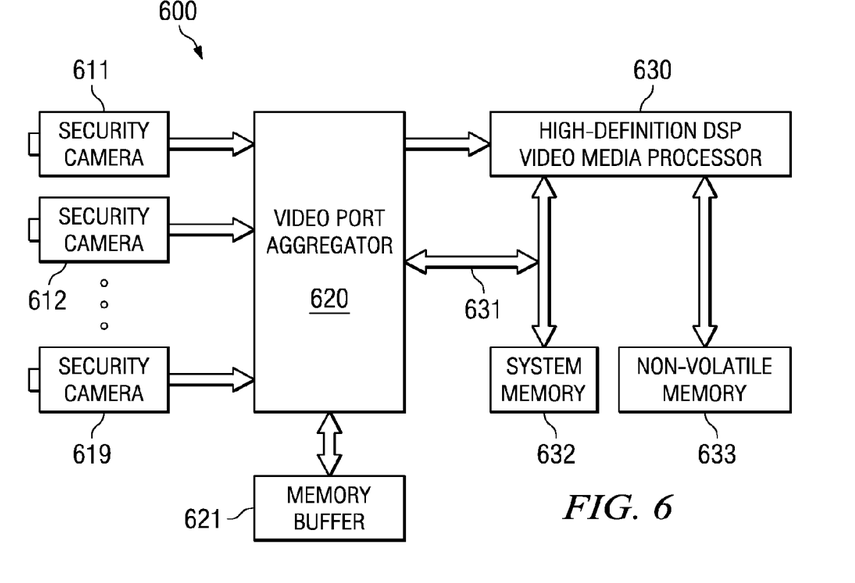
FIG. 6 is a block diagram of the use on the video aggregator of this invention in a video security camera system using the digital signal processor described in conjunction with FIGS. 1 to 4.

FIG. 6 illustrates an overview 600 of this invention when used with a digital media integrated circuit including a digital signal processor as described above in conjunction with FIGS. 1 to 4. Plural security cameras 611, 612 to 619 supply their video feeds to video aggregator 620. In conjunction with memory buffer 621, video aggregator 620 combines the plural input video signals into one high definition television output signal. This HDTV output is coupled to a HDTV video port of high definition DSP video media processor 630. High definition DSP video media processor 630 employs system memory 632 accessed via system memory bus 631 for program storage and for storage of temporary files created in forming compressed video data. System memory bus 631 is further connected to video port aggregator 620 for a purpose that will be further explained below. This compressed video data is more permanently stored in non-volatile memory 633. Non-volatile memory 633 preferably consists of a computer hard disk drive. In other applications non-volatile memory 633 may consist of electrically programmable read only memory (EPROM) or FLASH memory. High definition DSP video media processor 630 preferably separates the channels before video compression. These would then be stored in separately accessible areas of non-volatile memory 633 for possible later use. High definition DSP video processor 630 preferably stores the separated and compressed video data streams in conjunction with metadata providing easy access to particular time windows of security camera video from any of the security cameras 611 to 619.

TABLE 2

| Input Channels | Target Cost | DRAM (16 b) |
| --- | --- | --- |
| 4 | $3 | 64 Mb SDR-133 MHz |
| 8 | $4 | 128 Mb DDR-200 MHz |
| 16 | $8 | 256 Mb DDR-400 MHz |

Figure 7:
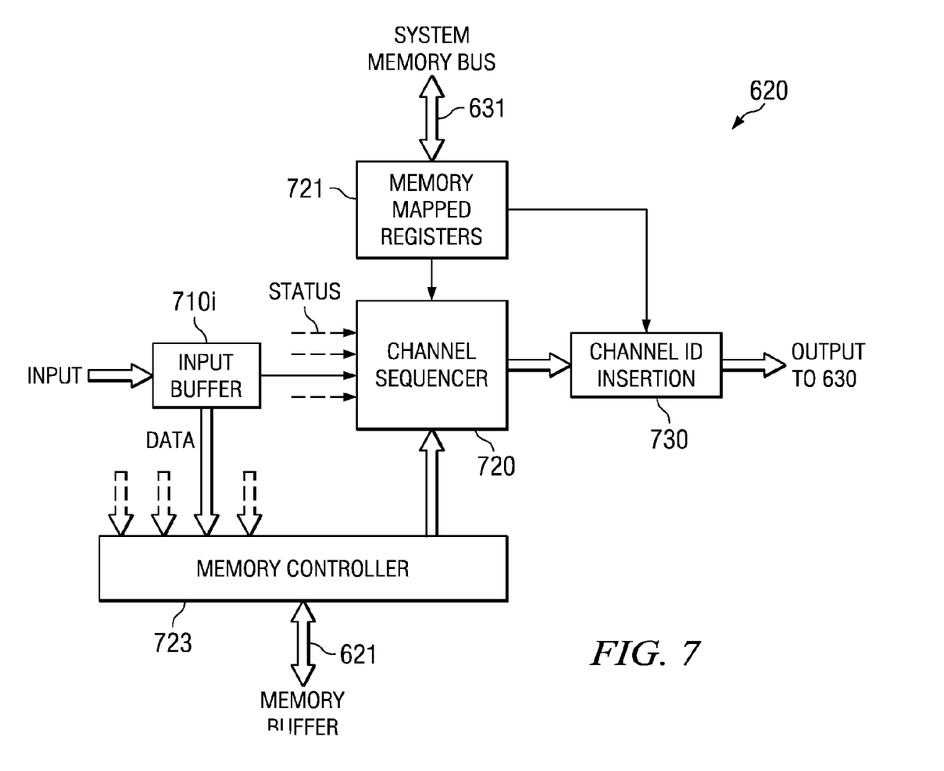
FIG. 7 is a block diagram of one embodiment of the video aggregator of this application.

FIG. 7 is a block diagram of one embodiment of the video aggregator of this application. Video port aggregator includes: an input buffer 710i for each channel; a channel sequencer 720 controlling data output; a set of memory mapped registers 721 storing control data used by channel sequencer 720; memory controller 723 controlling memory accessed to memory buffer 621; and channel ID insertion 730 which outputs data including channel identity (ID) for supply go high-definition DSP video media processor 630.

An input buffer 710i is provided for each input channel supported. In this exemplary embodiment a digital input is assumed. If any of security cameras 611 to 619 generate analog video signals, these are digitized separately before being input to the corresponding input buffer 710i. The video data received by input buffer 710i for the corresponding channel is supplied to memory controller 723.

Memory controlled 723 transfers incoming data from the plural input buffers 710i to predetermined areas in memory buffer 621 (not shown in FIG. 7). Memory controller 723 preferably operates like an external direct memory access (EDMA) unit directing incoming data to corresponding locations in memory. Known memory management techniques that could be used in this application include ping-pong buffering and circular addressing. In ping-pong buffering memory controller 723 employs two memory areas in memory buffer 620, each large enough for one unit of data. In operation memory controller 723 would fill a first ping-pong buffer with data. The opposite ping-pong buffer storing the previous data is available for read-out. Following the write and read cycle, memory controller 723 would reverse roles of the two buffers. Circular addressing employs address generation that wraps around a designated memory area. A first pointer indicates the write location within the circular buffer. A second pointer indicates the read location within the circular buffer. Memory controller 723 writes video data from the corresponding input buffer into memory buffer 621 at the location of the write buffer. Memory controlled 723 reads video data from the location of the read buffer. The read buffer always trails the write buffer. In this application, reads would only take place following write of a predetermined unit of data. Then the read would transmit the whole predetermined unit of data.

To meet various price/density points, video aggregator 620 is preferably offered in at least 3 different sizes. Table 2 lists the preferred characteristics of the 3 sizes. The DRAM column notes the size, character and speed required of memory buffer 621 to meet the data transfer requirements. The DRAM is either single data rate (SDR) or double data rate (DDR) in clock frequencies from 133 MHz to 400 MHz.

Memory mapped registers 721 set control parameters for many aspects of operation of video port aggregator 620. As indicated by the name, memory mapped registers 721 are within the read/write memory address space of high-definition DSP video media processor 630. These memory mapped registers 721 are accessed for reading and writing by high-definition DSP video media processor 630 via system memory bus 631. Each register is mapped to a predetermined address. Any read or write to one of these addresses performs the memory operation to the corresponding register within memory mapped registers 721. Priority is set for each channel by the data within memory mapped registers 721. Input channels can be frame-rate reduced by 1/N by keeping only every Nth frame. This activation and deactivation of this mode and the value of N is set by a register within memory mapped registers 721 corresponding to the input channel. Suppressed frames are discarded and not written to memory 621. Suppression of the entire channel of data is also controlled by data in memory mapped registers 721.

Channel sequencer 720 receives status data from each input buffer 710*i*. This status data indicates the completion of receipt of one unit of data from the corresponding channel. In conjunction with data in memory mapped registers 721 and this status data, channel sequencer 720 controls output of data from memory buffer 621 via memory controller 723. Output sequencing controlled by channel sequencer 720 is on a priority basis.

Memory mapped registers 721 set control parameters for many aspects of operation of video port aggregator 620. As indicated by the name, memory mapped registers 721 are within the read/write memory address space of high-definition DSP video media processor 630. These memory mapped registers 721 are accessed for reading and writing by high-definition DSP video media processor 630 via system memory bus 631. Each register is mapped to a predetermined address. Any read or write to one of these addresses performs the memory operation to the corresponding register within memory mapped registers 721. Priority is set for each channel by the data within memory mapped registers 721. Input channels can be frame-rate reduced by 1/N by keeping only every Nth frame. This activation and deactivation of this mode and the value of N is set by a register within memory mapped registers 721 corresponding to the input channel. Suppressed frames are discarded and not written to memory buffer 621. Suppression of the entire channel of data is also controlled by data in memory mapped registers 721.

Channel sequencer 720 operates as follows. When the output port is available, channel sequencer 720 selects the input channel with the highest priority having a complete data set stored in memory buffer 621. Channel sequencer 720 causes memory controller 723 to recall this data from memory buffer 621. This recalled data is routed to channel ID insertion 730 and then output. As shown in FIG. 6, this data is transmitted to the single HD video port of high-definition DSP video media processor 630. The data set may be a frame, field or line depending on the mode set in memory mapped registers 721.

In the preferred embodiment the output port is clocked fast enough relative to the inputs ports that a fairness scheme is not necessary to prevent overflow on low-priority channels. Input channels may optionally be disabled to prevent them from being presented on the output.

Video port aggregator 620 must insert channel ID information on each outgoing frame. As illustrated in FIG. 7 this task is preformed by channel ID insertion 730. Since all expected devices are capable of saving data in the vertical blanking interval (VBI), channel ID insertion 730 preferably inserts channel ID information in the VBI. Because future devices may be able to extract video ancillary (VANC) data, the channel ID data should be in that format. Data will be inserted in each VBI on a line that is controlled by data in memory mapped registers 721.

Input channels are independently decoded. All data between a start of active video (SAV) signal and an end of active video (EAV) signal is preserved in memory buffer 621 to save any ancillary data in the vertical blanking interval (VBI). This data is read from memory buffer 621 as described above and sent to the output port.

Figure 8:
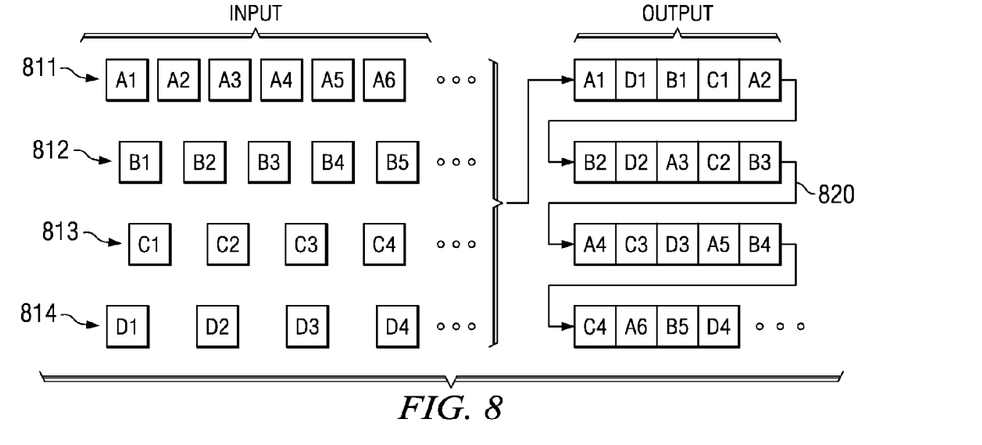
FIG. 8 illustrates a first example of video aggregation of this invention.
Figure 9:
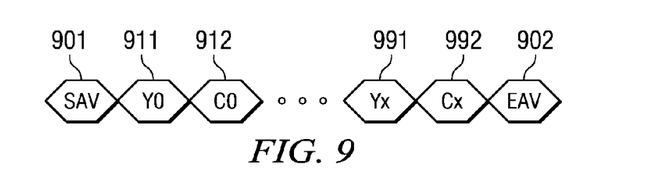
FIG. 9 illustrates the video data assembled by the video aggregation of this invention in a field mode.

FIGS. 8 and 9 illustrate processing by video port aggregator 660 in frame mode. In frame mode the unit of data buffered in memory buffer 621 is an entire frame. A frame includes 2 fields for interlaced sources. Channel sequencer 720 checks for an input channel that has written data to memory and has an incoming SAV signal with V=1 indicating a current vertical blanking status and F=0 indicating an even field. Channel sequencer 720 then indicates this data is ready for read out from memory buffer 621 and output via channel ID insertion 730. This data can now be read out to high definition DSP video processor 630.

FIG. 8 illustrates an example of mixing plural video streams in the frame mode. FIG. 8 illustrates plural incoming video streams. Incoming video stream 811 includes frames A1, A2, A3, A4, A5 and A6 during a time period of interest. Incoming video stream 812 includes frames B1, B2, B3, B4 and B5 during this time period of interest. Incoming video stream 813 includes frames C1, C2, C3 and C4. Incoming video stream 814 includes frames D1, D2, D3 and D4. This example shows differing frame rates because this invention supports differing frame rates in the incoming video streams.

As illustrated schematically in FIG. 8, video port aggregator 620 converts the four incoming video streams 811, 812, 813 and 814 into a single output video stream 820. The order of frames within output video stream 820 (A1, D1, B1, A2, B2, D2, A3, C2, B3, A4, C3, D3, A5, B4, C4, A6, B5, D4) corresponds to the time of reception of the corresponding frames. In the event that frames from two input video streams are ready to output at the same time, memory mapped registers 721 sets a priority hierarchy. The frame with the highest priority is first transmitted, then the frame with the next lower priority. This may be seen in the first inclusion of frame A1 over same completion time frame D1.

Frames received by high definition DSP video processor 630 can use full image processing available such as the video compression described above in conjunction with FIG. 5. This is because all the data of each transmitted frame comes from only one channel.

Software running on high definition DSP video processor 630 must process the video port data to preserve the video ancillary (VANC) data that identifies the source channel. This software can then examine this data on all incoming frames to hand off the data appropriately. Note that the frame order is not necessarily constant due to the priority scheme and the fact that the video streams from the security cameras 611 to

619 are asynchronous. Therefore the software running on high definition DSP video processor must check ID for all incoming frames.

The field mode is very similar to the frame mode. In the field mode the buffered unit of data is one field of an interlaced video stream. Field mode is identical to frame mode for progressive video streams. Once an input channel has written a whole field to memory and detects an incoming SAV with V=1, video port aggregator 620 marks the previous data complete for processing on the output queue. In this case the field bit F could indicate an even or an odd field.

Fields received by high definition DSP video processor 630 can use image processing features available in the video ports as long as they work on a field and not frame basis. This is because all the data on transmitted field is from only one channel. Note data from adjacent fields may be from different channels.

Software running on high definition DSP video processor 630 must process the video port data to preserve the VANC data that identifies the source channel. This software can then examine this data on all incoming fields to hand off the data appropriately. Note that the field order is not necessarily constant. This is because of the priority scheme and the fact that the video streams from the security cameras 611 to 619 are asynchronous. Thus this ID should be checked for all incoming frames. The field IDs of successive outgoing fields may not necessarily alternate for the same reason.

FIG. 9 illustrates a typical data organization in the frame or field modes. The data begins with a start of active video (SAV) code 901. Next is the luminance data for an initial portion of the frame/field Y0 911. Then comes chrominance data for that initial portion of the frame/field C0 912. Paired luminance and chrominance data for further portions of the frame/field follow until the last luminance data Yx 991 and the last chrominance data Cx 992. The end of the frame/field is marked by end of active video (EAV) code 902.

Both the frame and field modes require storage of a considerable amount of data. A line mode reduces latency through the chip and memory buffering requirements. This probably eliminates the need for dynamic random access memory (DRAM) inside video port aggregator 620 enabling sole reliance upon static random access memory (SRAM) available on the same integrated circuit.

Figure 11:
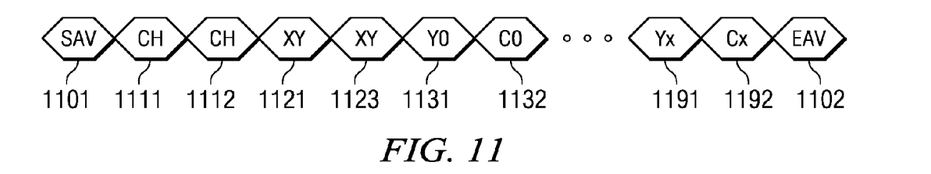
FIG. 11 illustrates the video data assembled by the video aggregation of this invention in a line mode.
Figure 12:
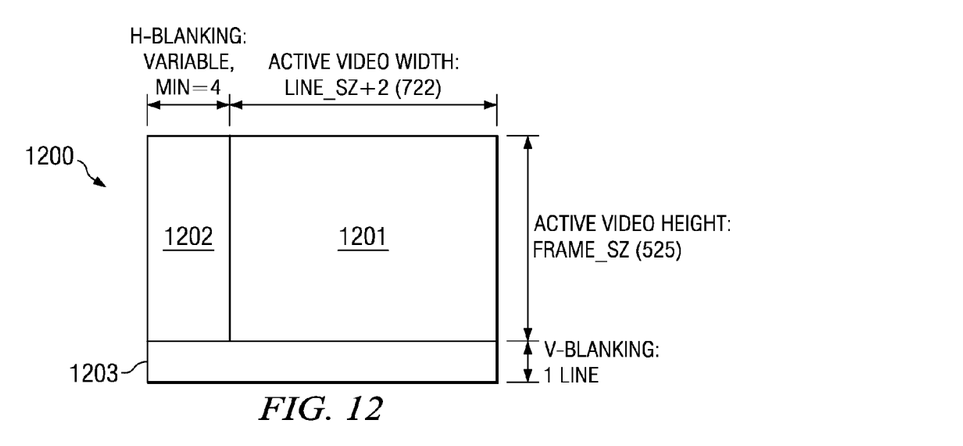
FIG. 12 illustrates the construction of an artificial frame using data encapsulation in the line mode of this invention.

The line buffer mode uses a line (or sub-line) as the data element size to buffer. Since data is rearranged on a line-by-line basis, there can be no guarantee output line order makes sense to a video decoder. Therefore data is encapsulated so that all input data is preserved and output data is understandable to the decoder. This encapsulation involves the assembly of artificial frames of data. This process is illustrated in FIGS. 10, 11 and 12.

Figure 10:
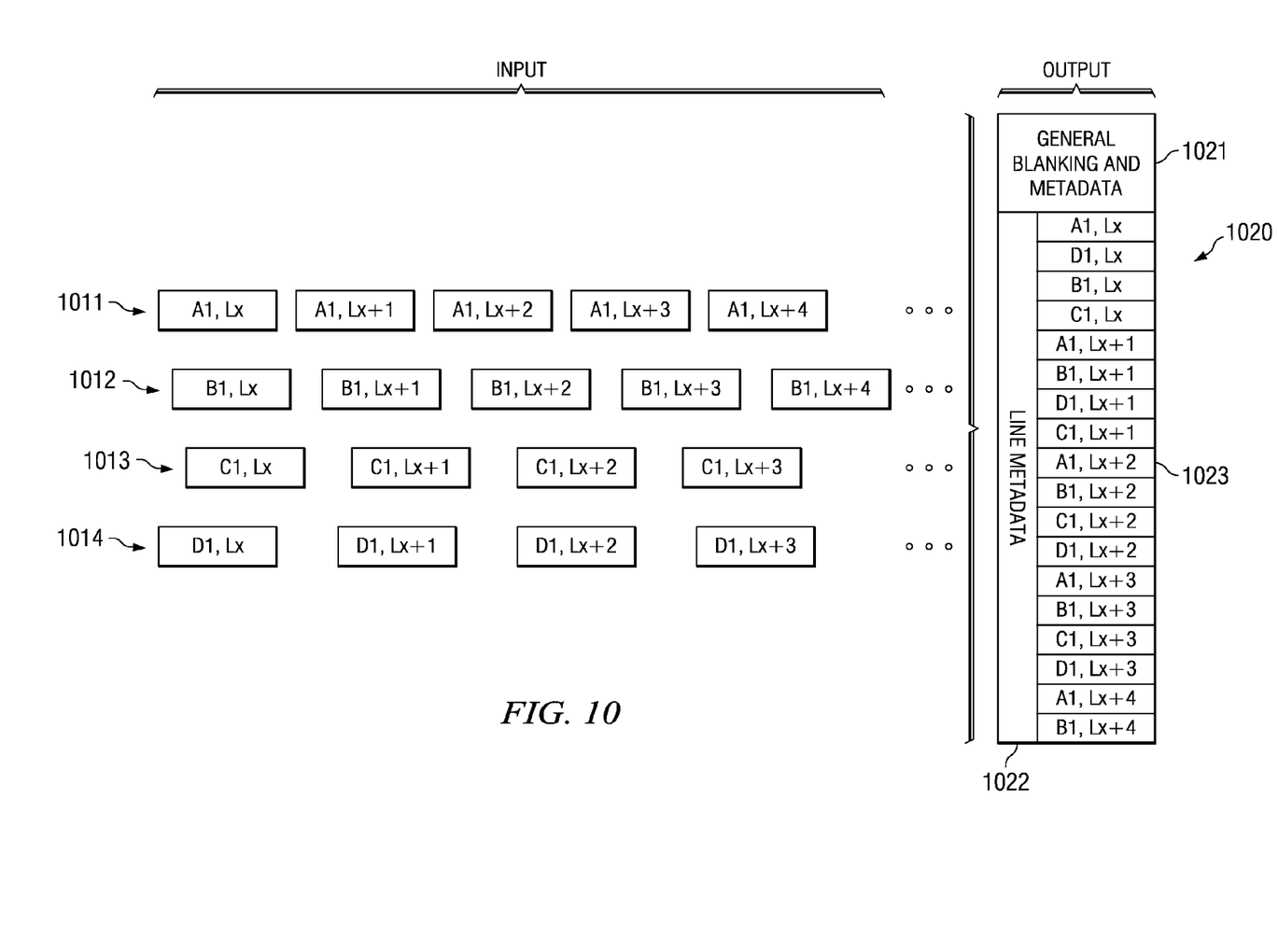
FIG. 10 illustrates a second example of video aggregation of this invention.

FIG. 10 illustrates an example of mixing plural video streams in the frame mode. FIG. 10 illustrates plural incoming video streams. Incoming video stream 1011 includes frame A1, lines Lx, Lx+1, Lx+2, Lx+3 and Lx+4 during a time period of interest. Incoming video stream 1012 includes frame B1, lines Lx, Lx+1, Lx+2, Lx+3 and Lx+4 during this time period of interest. Incoming video stream 1013 includes frame C1, lines Lx, Lx+1, Lx+2 and Lx+3. Incoming video stream 1014 includes frame D1, lines Lx, Lx+1, Lx+2 and Lx+3. This example shows differing line rates because this invention supports differing video rates in the incoming video streams.

As illustrated schematically in FIG. 10, video port aggregator 620 converts the four incoming video streams 1011, 1012, 1013 and 1014 into a single output video frame 1020. As shown in FIG. 10 output video stream 1020 consists of an artificial frame 1020 including general blanking and metadata 1021, line metadata 1022 and line data 1023. The order of lines within output video stream 820 (A1, Lx; D1, Lx; B1, Lx; C1, Lx; A1, Lx+1; B1, Lx+1; D1, Lx+1; C1, Lx+1; A1, Lx+2; B1, Lx+2; C1, Lx+2; D1, Lx+2; A1, Lx+3; B1, Lx+3; C1, Lx+3; A1, Lx+4; B1, Lx+4) corresponds to the time of reception of the corresponding lines. In the event that lines from two input video streams are ready to output at the same time, memory mapped registers 721 sets a priority hierarchy. The frame with the highest priority is first transmitted, then the frame with the next lower priority. This may be seen in the first inclusion of line A1, line Lx over same completion time line D1, line Lx.

To prevent confusion over image line count and vertical blanking appearing haphazardly, SAV/EAV codes will have field identity (FID) and V data stripped and replaced with FID=V=0. Optionally, as set by data in memory mapped registers 721, each output line will have two pixels inserted right after SAV where Y0=C0=Channel ID of line, Y1=C1=original XY from SAV. To further save resources in video port aggregator, a sub-line feature will limit output line size to a programmable LINE_SZ set by data stored in memory mapped registers 721. If input line size exceeds this setting, video aggregator 620 will insert EAV/SAV when count is reached and treat the input as multiple lines.

FIG. 11 illustrates a typical data organization in the frame or field modes. The data begins with a start of active video (SAV) code 1101. Next is another set of portions of data 1111 and 1112 include the channel ID for the second line. Next is the original XY data for the second line at additional portions 1121 and 1122. Then comes the paired luminance and chrominance data for further portions of the line. This follows for each line until he last luminance data Yx 1191 of the last line and the last chrominance data Cx 1192 of the last line. The end of the artificial frame is marked by EAV code 1102. Data 1111 and 1112 correspond to general blanking and metadata 1021. Data 1121 and 1122 correspond to line metadata 1022.

Since vertical blanking in the input is being masked out, video port aggregator 620 will insert an artificial vertical sync every FRAME_SZ. This frame size FRAME_SZ is set by data stored in memory mapped registers 721. The data in the vertical synchronization line will be a map of the previous channel ID and XY information. Y0=Channel ID of line 0, C0=XY from that line 0 original SAV code, Y1=Channel ID of line 1, C1=XY from line 1 original SAV code, etc. This causes the stream will appear to be progressive data with 1 line of vertical blanking to an unaware BT decoder. The picture size is FRAME_SZ+1 lines by LINE_SZ or LINE_SZ+2.

FIG. 12 illustrates an example of such an artificial frame. This artificial frame includes data 1201 derived from the received line data, horizontal blanking interval 1202 and vertical blanking interval 1203. The horizontal blanking interval is set by data in memory mapped registers 721 but must be a minimum of 4. The active line width LINE_SZ+2 is set by data in memory mapped registers 721. The active video height FRAME_SZ is set by data in memory mapped registers 721. The vertical blanking interval equals one horizontal line length.

Since data from each line of data could belong to a different channel and has been encapsulated, high definition DSP video processor 630 will perform no image processing. Software on high definition DSP video processor 630 must read the IDs at the beginning of the line or in the vertical synchronization interval to descramble. High definition DSP video processor 630 with optional help from an external direct memory access unit (EDMA) can sort the data into independent channel buffers. Once high definition DSP video processor 630 sorts the data into individual channel buffers, the original SAV XY data should be used to determine vertical synchronization for each channel. With vertical synchronization determined, the active picture data can be extracted. Additionally, VANC or other data in the VBI can be searched for and extracted. If the pixel insertion feature was turned on, this data should be stripped during active picture extraction to prevent this noise from appearing in the active picture.

Video aggregator 620 preferably supports the following video standards up to 16 independent BT.656 video streams with three possible multiplexing modes. These multiplexing modes are: 27 MHz unmultiplexed; 54 MHz with 2-way time division multiplexing (TDM) (byte interleaving); and 108 MHz with 4-way TDM (byte interleaving). Eight BT.656 D1 video streams would therefore require: 8 by 8 bits at 27 MHz (unmultiplexed); 4 by 8 bits at 54 MHz (2-way TDM); or 2 by 8 bits at 108 MHz (4-way TDM). Sixteen BT.656 CIF video streams would therefore require: 16 by 8 bits at 27 MHz (unmultiplexed); 8 by 8 bits at 54 MHz (2-way TDM); or 4 by 8 bits at 108 MHz (4-way TDM).

Video port aggregator 620 does no video scaling. When used for CIF frames, the data must be presented on the input port in CIF resolution.

What is claimed is:

1. A video port aggregator comprising:
a plurality of inputs for receiving asynchronous video data streams;
a plurality of input buffers, each input buffer corresponding to one of said inputs, each input buffer generating video data and a status signal corresponding to said asynchronous video data stream;
a memory controller connected to said plurality of input buffers for writing video data corresponding to said asynchronous video data streams from said input buffers to corresponding locations within an external memory;
a channel sequencer connected to said plurality of input buffers and said memory controller, said channel sequencer triggering said memory controller to read data out of the external memory for transmission to a single video output port when said corresponding status signal indicates receipt of a predetermined portion of data, said read of data out of the external memory occurring at a faster rate than the writing of video data corresponding to on asynchronous video data stream, said channel sequencer controlling said memory controller to form said data transmitted via said single video output port into artificial video frames including data from plural of the asynchronous video data streams.

2. The video port aggregator of claim 1, further comprising:
a channel ID insertion unit receiving video data read out from the external memory by said memory controller and inserting an identity signal corresponding to said asynchronous data stream into said data transmitted to the single video output port.

3. The video port aggregator of claim 1, wherein:
said predetermined portion of data is a video is a line; and
wherein said channel sequencer triggers said memory controller to read data out of the external memory corresponding to a line of an asynchronous video data stream, and said channel sequencer assembles artificial video frames from line data read out of the external memory, said artificial video frames including data indicating the asynchronous video data stream corresponding to each read out video line and said artificial video frames including lines from plural of said asynchronous video data streams.

4. The video port aggregator of claim 1, wherein:
a register storing data indicative of a decimation number N; and
said memory controller writing video data corresponding to said asynchronous video data streams in corresponding locations within an external memory for each Nth frame.

5. The video port aggregator of claim 2, wherein:
said predetermined portion of data is a video is a line; and
said channel sequencer is operable to form artificial video frames by
starting each horizontal line of said artificial video frame with a horizontal blanking interval data,
appending a currently read out line of an asynchronous video data stream to a beginning of current horizontal line of said artificial video frame including inserting said identity signal corresponding to the asynchronous data stream into a beginning of data of said read out line of said asynchronous video data stream and inserting an end of active video signal, and
upon reaching an end of active video height at an end of a horizontal line of said artificial video frame, appending at least one vertical blanking interval and starting a new artificial video frame.

6. The video port aggregator of claim 5, further including:
an active vertical line height register connected to said channel sequencer storing the height of an active frame in said artificial video frames.

7. The video port aggregator of claim 2, wherein:
said predetermined portion of data is a video is a line; and
said channel sequencer is operable to form artificial video frames by
starting each horizontal line of said artificial video frame with a horizontal blanking interval data,
appending a currently read out line of an asynchronous video data stream to a current horizontal line of said artificial video frame, inserting said identity signal corresponding to the asynchronous data stream into a beginning of data of said read out line of said asynchronous video data stream,
upon reaching an end of active video width in any horizontal line of said artificial frame, inserting an end of active video signal and appending any remaining data of currently read out line of the asynchronous video data stream to a next line of the artificial video frame, and
upon reaching an end of active video height at an end of a horizontal line of said artificial video frame, appending at least one vertical blanking interval and starting a new artificial video frame.

8. The video port aggregator of claim 5, further including:
an active line width register connected to said channel sequencer storing the length of an active line in said artificial video frames; and
an active vertical line height register connected to said channel sequencer storing the height of an active frame in said artificial video frames.

* * * * *